US008345742B2

(12) United States Patent
Lee et al.

(10) Patent No.: US 8,345,742 B2
(45) Date of Patent: Jan. 1, 2013

(54) METHOD OF PROCESSING MOVING PICTURE AND APPARATUS THEREOF

(75) Inventors: Jae-Hyung Lee, Yongin-si (KR); Sun-Ok Cho, Seoul (KR); Kil-Youn Kim, Seoul (KR); Dae-Bong Park, Seoul (KR)

(73) Assignee: Enswers Co., Ltd., Seoul (KR)

( * ) Notice: Subject to any disclaimer, the term of this patent is extended or adjusted under 35 U.S.C. 154(b) by 445 days.

(21) Appl. No.: 12/598,199

(22) PCT Filed: Jun. 4, 2008

(86) PCT No.: PCT/KR2008/003142
§ 371 (c)(1),
(2), (4) Date: Oct. 29, 2009

(87) PCT Pub. No.: WO2008/150109
PCT Pub. Date: Dec. 11, 2008

(65) Prior Publication Data
US 2010/0134693 A1    Jun. 3, 2010

(30) Foreign Application Priority Data

| Jun. 4, 2007 | (KR) | 10-2007-0054601 |
| Jun. 21, 2007 | (KR) | 10-2007-0060978 |
| Jun. 2, 2008 | (KR) | 10-2008-0051688 |

(51) Int. Cl.
*G06F 17/30* (2006.01)
(52) U.S. Cl. ............................. 375/240.01; 707/999.101
(58) Field of Classification Search .................. None
See application file for complete search history.

(56) References Cited

U.S. PATENT DOCUMENTS

| 2001/0004739 A1* | 6/2001 | Sekiguchi et al. ............ 707/100 |
| 2002/0093591 A1* | 7/2002 | Gong et al. .................... 348/515 |
| 2003/0161396 A1* | 8/2003 | Foote et al. .............. 375/240.01 |
| 2006/0139461 A1* | 6/2006 | Matsui et al. ............... 348/231.2 |

OTHER PUBLICATIONS

WIPO, International Search Report for International Application No. PCT/KR2008/003142.

* cited by examiner

*Primary Examiner* — Christopher S Kelley
*Assistant Examiner* — Mohammed Jebari
(74) *Attorney, Agent, or Firm* — Intellectual Property Law Group LLP

(57) ABSTRACT

A method of processing moving picture and an apparatus thereof are disclosed. A method of processing a moving picture comprising: calculating a color distribution vector for each of plural sub-frames which are generated by dividing a frame of the moving picture; generating a first order differential of the color distribution vector based on the color distribution vector; generating a second order differential of the color distribution vector based on the first order differential of the color distribution vector; and generating a feature vector of the frame based on the color distribution vector, the first order differential of the color distribution vector and the second order differential of the color distribution vector, is provided. The moving picture processing method can provide an efficient mean to determine commonality between moving pictures by extracting a feature from a frame of the moving pictures.

5 Claims, 14 Drawing Sheets

FIG. 8
(a) entirely common
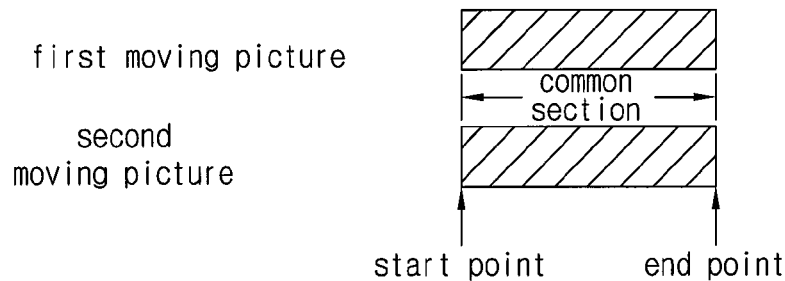
(b) entirely included
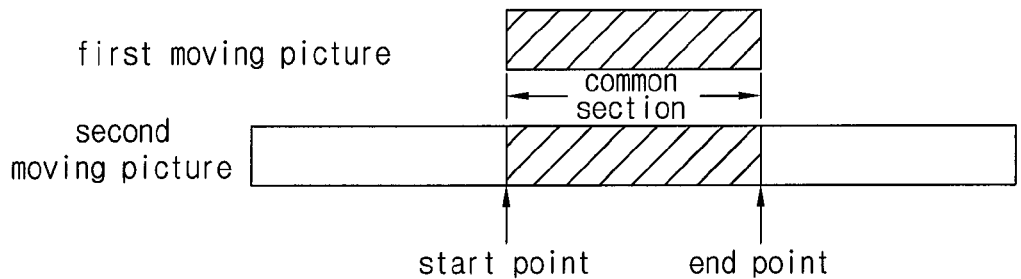
(c) partially common-1
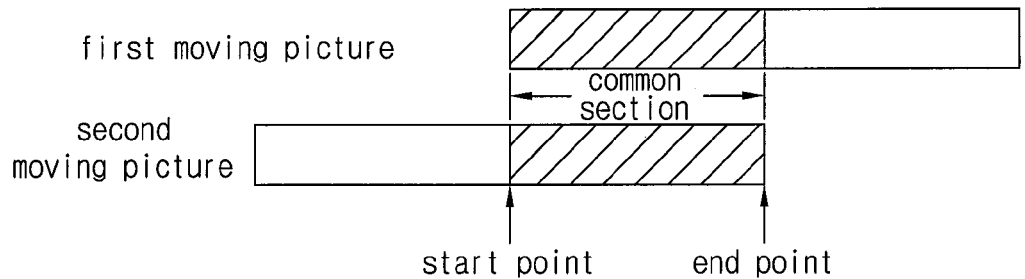
(d) partially common-2
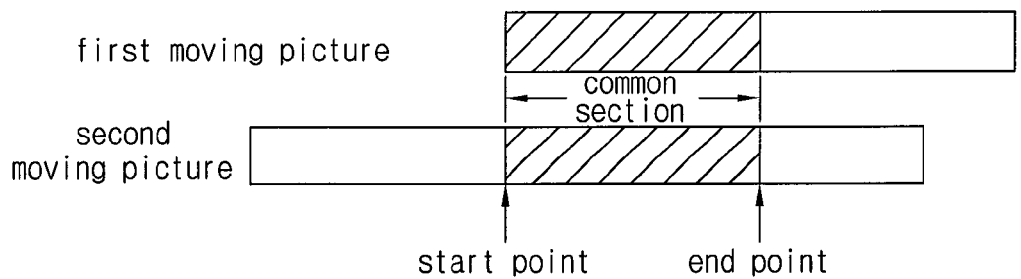

FIG. 12

| Cluster ID | representative moving picture list | rank | moving picture list | date |
|---|---|---|---|---|
| 1 | 3:0/1202,5:220/600 | 5 | 3:0/1202,5:220/600, 7:500/700,9:600/800 ,11:700/900 | 2007-04-12 00:00:00 |
| 2 | 4:0/500 | 1 | 4:0/500 | 2007-04-15 00:00:00 |
| 3 | 1:0/1450,2:0/1400 | 25 | 1:0/1450,2:0/1400, 10:100/1300, 11:120/1400, 12:120/1400, .... | 2007-04-20 00:00:00 |
| ⋮ | ⋮ | ⋮ | ⋮ | ⋮ |

METHOD OF PROCESSING MOVING PICTURE AND APPARATUS THEREOF

TECHNICAL FIELD

The present invention relates to a method of processing moving picture and an apparatus thereof.

BACKGROUND ART

According to progress of internet technology and popularization of moving picture shooting devices including digital cameras, UCC (user created contents) became a familiar terminology. A cheaper storage and a faster broadband communication network make people to share information with a moving picture rather than still image. Moreover services like YouTube can provide an environment in which moving pictures can be shared easily.

But, despite of drastically increasing numbers of moving pictures shared on internet, progress in moving picture search technology are relatively slow. In general, moving picture search result provides a simple list of moving pictures which are related to a keyword inputted by a user (for an example, title of a moving picture includes the keyword).

In this case, a list which shows a same moving picture repetitively may be provided frequently. It is required to consider commonality or similarity between moving pictures to improve the search result. Considering commonality and similarity between moving pictures can be helpful to detect an infringement of copyright by illegal distribution of contents.

However, for determining commonality or similarity of moving pictures, a direct comparison for moving pictures in binaries requires excessive calculating power. Thus, a relatively small size comparison criterion (comparison data) which represents information of a moving picture is required.

A more efficient method of comparing moving pictures is required because it is a time-consuming work to compare large-size moving pictures even by a relatively small size comparison criterion.

As one solution for a list which shows identical moving pictures or extremely similar moving pictures repetitively in a moving picture search result by a search engine, a clustering method of plural moving pictures by considering commonality (or similarity) is required.

DISCLOSURE

Technical Problem

One aspect of the invention is to provide a moving picture processing method and an apparatus thereof to enhance efficiency of moving picture comparison process and providing the comparison result.

One aspect of the invention is to provide a method and an apparatus to generate a feature vector of a moving picture (frame feature vector) which can be used as a comparison criterion for determining commonality and similarity between moving pictures.

One aspect of the invention is provide a method and an apparatus to detect a common section between two moving pictures using feature vectors of the moving pictures and to obtain time information of the common section.

One aspect of the invention is to provide a method and an apparatus to gather moving pictures which have commonality (namely, share a common section) into a group.

Technical Solution

One aspect of the invention provides a method of processing a moving picture. A color distribution vector for each of a plurality of sub-frames generated by dividing a frame of the moving picture can be calculated. A first order differential of the color distribution vector can be generated based on the color distribution vector. A second order differential of the color distribution vector can be generated based on the first order differential of the color distribution vector of the frame. A feature vector of the frame can be generated based on the color distribution vector, the first order differential of the color distribution vector and the second order differential of the color distribution vector.

For generating of a feature vector of a frame, a plurality of components can be selected, as components of the frame feature vector, from a set consisting of components of a color distribution vector of the frame, a first order differential of the color distribution vector and a second order differential of the color distribution vector.

For generating a color distribution vector of a sub-frame, an average color vector of the sub-frame can be calculated by averaging color vectors of pixels of the sub-frame.

The average color vector of the sub-frame can be normalized. In the normalizing of the average color vector can utilize at least one selected from the group consisting of a minimum vector and an average vector of average color vectors of the plurality of sub-frames belonging to a time section including the sub-frame and corresponding to a same display area as the sub-frame in the moving picture.

Another aspect of the invention provides a method of processing a moving picture. A frame feature vector for each of a first moving picture and a second moving picture can be generated. A common section of the first moving picture and the second moving picture can be detected by comparing the frame feature vector of the first moving picture with the frame feature vector of the second moving picture.

For detecting of the common section, comparing of moving picture segments can be performed. For the comparing of moving picture segments, a commonality evaluation value of a first moving picture segment and a second moving picture segment can be generated by comparing feature vectors of p (p is an arbitrary natural number, $p \geq 1$) frames of the first moving picture segment of the first moving picture with feature vectors of p frames of the second moving picture segment of the second moving picture respectively. The p frames of the second moving picture segment can have a corresponding arrangement to an arrangement of the p frames of the first moving picture segment.

The commonality evaluation value can be generated based on a distance between the feature vector of the first moving picture segment and the corresponding feature vector of the second moving picture segment. (The first and the second moving picture segment can have a same length of $\Delta t$.)

The comparing of moving picture segments can be is performed repetitively for the first moving picture segment start time t1 (after t1 from the start point of the first moving picture) and the second moving picture segment start time t2 (after t2 from the start point of the second moving picture). The t1 can be equal to or larger than 0 and be smaller than length of the first moving picture. The t2 can be equal to or larger than 0 and be smaller than length of the second moving picture.

In case the commonality evaluation value indicates commonality in the first moving picture segment and the second moving picture segment, a start time and an end time of a common section in the first moving picture and the second moving picture can be detected respectively, by comparing the feature vector of the first moving picture with the feature vector of the second moving picture applying a greater fps (frames per second) than that of p frames in the first moving picture segment and the second moving picture segment.

The comparing of moving picture segments performed by increasing the start time t2 of the second moving picture segment from start point of the second moving picture(t2=0), with the start time t1 set to start point of the first moving picture(t1=0). In this case, for a start time tg of the second moving picture segment which make the commonality evaluation value to show commonality in the first moving picture segment and the second moving picture segment, the common section start-end point detection can compare the feature vector of the first moving picture only with the feature vector of frame of the second moving picture which locates after the tg from the start point.

For repeating the comparing of moving picture segments, in case the commonality evaluation value does not satisfy a reference value that is required to show commonality in the first moving picture segment and the second moving picture segment, a change of the first moving picture segment start time t1 and/or a change of the second moving picture segment start time t2 can be proportional to difference between the reference value and the commonality evaluation value.

Another aspect of the invention provides a method of processing a moving picture. A feature vector for each of a first moving picture and a second moving picture from a moving picture set including plural moving pictures can be generated. A common section of the two moving pictures can be detected by comparing the feature vector of the first moving picture and the feature vector of the second moving picture. In case a common section of the first moving picture and the second moving picture is detected, a cluster identifier matching can be performed for the first moving picture and the second moving picture to have a same cluster identifier. In case an old cluster identifier of a moving picture is replaced with a new cluster identifier during the cluster identifier matching, replacement of a cluster identifier for another moving picture which has the old cluster identifier (neither of the first and the second moving picture) to replace the old cluster identifier with the new cluster identifier, can be performed.

A text token for moving pictures in a moving picture set can be generated. Detection of common section and manipulation of cluster identifier for moving pictures which share a text token can precede those processes for moving pictures which does not share the text token.

The moving picture processing methods described above (frame feature vector generating method, common section detecting method and moving picture clustering method) can be executed by a computer. The moving picture processing methods can be stored, as a program, on a computer readable medium.

Another aspect of the invention provides an apparatus of method of processing a moving picture. A feature vector generating part of the apparatus can generate a feature vector each of the first moving picture and the second moving picture. A common section detecting part of the apparatus can detect a common section of the first moving picture and the second moving picture by comparing the feature vector of the first moving picture with the feature vector of the second moving picture.

A feature vector generating part can calculate color distribution vector for each of plural sub-frames which are generated by dividing a frame of a moving picture. The feature vector generating part can generate a feature vector of the frame based on the color distribution vector, a first order differential of the color distribution vector and a second order differential of the color distribution vector. The feature vector generating part can select plural components, as components of the frame feature vector, from a set which composed of components of the color distribution vector, the first order differential of the color distribution vector and the second order differential of the color distribution vector.

A common section detecting part of a moving picture processing apparatus can include a moving picture segment comparing part. The moving picture segment comparing part can generate a commonality evaluation value between a first moving picture segment which has a start time of t1 after start point of the first moving picture and a length of Δt and a second moving picture segment which has a start time of t2 after start point of the second moving picture and a length of Δt. The commonality evaluation value can be generated by comparing feature vectors of p (p is an arbitrary natural number, $p \geq 1$) frames of the first moving picture segment with feature vectors of p frames of the second moving picture segment which have a corresponding arrangement to an arrangement of the p frames of the first moving picture segment respectively.

The common section detecting part can include a common section start-end point detecting part. The common section start-end point detecting part detects a start point and an end point of a common section for each of the first moving picture and the second moving picture. The start point and the end point can be detected by comparing the feature vector of the first moving picture with the feature vector of the second moving picture applying a greater fps than that of p frames in the first moving picture segment and the second moving picture segment, in case the commonality evaluation value generated by the moving picture segment comparing part indicates commonality in the first moving picture segment and the second moving picture segment.

A moving picture processing apparatus can include a moving picture clustering part. In case a common section between the first moving picture and the second moving picture is detected by a common section detecting part of the moving picture processing apparatus, the moving picture clustering part can perform a cluster identifier matching. By the cluster identifier matching, the first moving picture and the second moving picture can have a same cluster identifier. In case an old cluster identifier is replaced with a new cluster identifier during the cluster identifier matching, the moving picture clustering part can replace the old cluster identifier of another moving picture (neither of the first moving picture and the second moving picture) with the new cluster identifier.

A moving picture processing apparatus can include a text token generating part. The text token generating part can generate a text token for each a first to a third moving picture. A feature vector generating part of the moving picture processing apparatus can generate a feature vector for the third moving picture.

In case there is a text token shared between the first moving picture and the second moving picture and there is no text token shared between the first moving picture and the third moving picture. A common section detecting part of a moving picture processing apparatus can perform common section detection for the first moving picture and the second moving picture preliminarily to common section detection for the first moving picture and the third moving picture.

Additional aspects and advantages of the present invention will be set forth in part in the description which follows, and in part will be obvious from the description, or may be learned by practice of the invention.

DESCRIPTION OF DRAWINGS

FIG. 8 illustrates commonality relations between two moving pictures according to one embodiment of the present invention.

FIG. 12 illustrates a data structure storing information of a moving picture cluster according to one embodiment of the present invention.

MODE FOR INVENTION

Embodiments of a method of processing moving picture and an apparatus thereof according to certain aspects of the invention will be described below in more detail with reference to the accompanying drawings. However description of the embodiments is not to limit the present invention to a certain embodiment. The description of the embodiments can be understood to include all conversions, equivalents and alternatives. In case a detail description of a related prior art may blur a point of the present invention, the detail description can be omitted. Also, in the description with reference to the accompanying drawings, those components are rendered the same reference number that are the same or are in correspondence regardless of the figure number, and redundant explanations are omitted.

Figure 1:
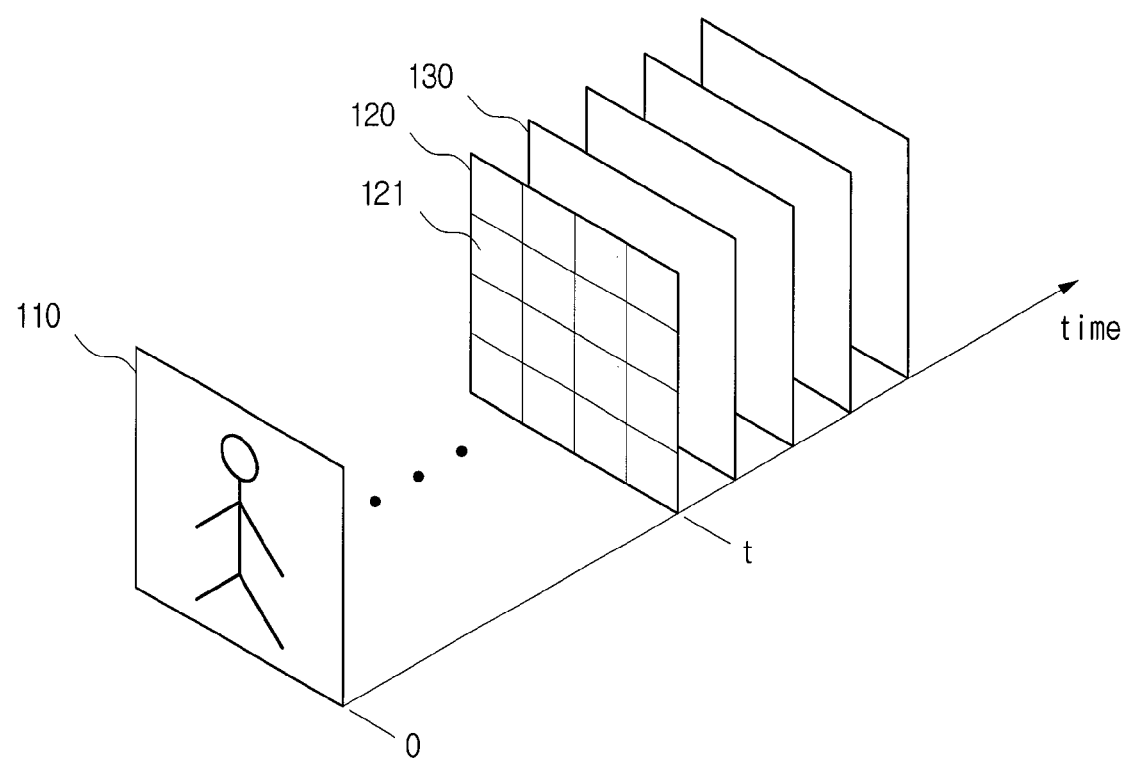
FIG. 1 illustrates a frame of a moving picture and its sub-frames according to one embodiment of the present invention.

FIG. 1 illustrates a frame of a moving picture and its sub-frames according to one embodiment of the present invention.

A frame can be a still image which composes a moving picture. A frame can be used as a unit for editing a moving picture. In general, a moving picture can be encoded to have 24 or 30 frames per second. A high quality moving picture can be can be encoded to have 60 frames per second.

In an embodiment of the present invention, target frames of a moving picture from which a feature vector is extracted for moving picture comparison do not have to maintain an encoding fps of the moving picture. Intervals between the target frames do not have to be constant.

The first frame (110) in FIG. 1 is the first frame of a moving picture. For a time axis of a moving picture, origin of the time axis can be the start point of the moving picture as in FIG. 1. The first frame can be a still image at the start point of the moving picture (t=0).

The second frame (120) and the third frame (130) are two adjacent frames. Time interval between the two adjacent frames can be calculated as a reciprocal of the fps in which the frames are defined. The frames, from which a feature vector is extracted for comparison of two moving pictures, can be defined in another feature fps independent from an encoding fps of the two moving pictures.

Referring to FIG. 1, the second frame (120) is divided by a 4×4 form and the first sub-frame (121) is one of the 16 sub-frames of the second frame. In this embodiment of the present invention, a feature vector of a frame is originated from color distribution information of a sub-frame. A process of generating a feature vector will be described in detail, referring a flow chart of FIG. 2.

Figure 2:
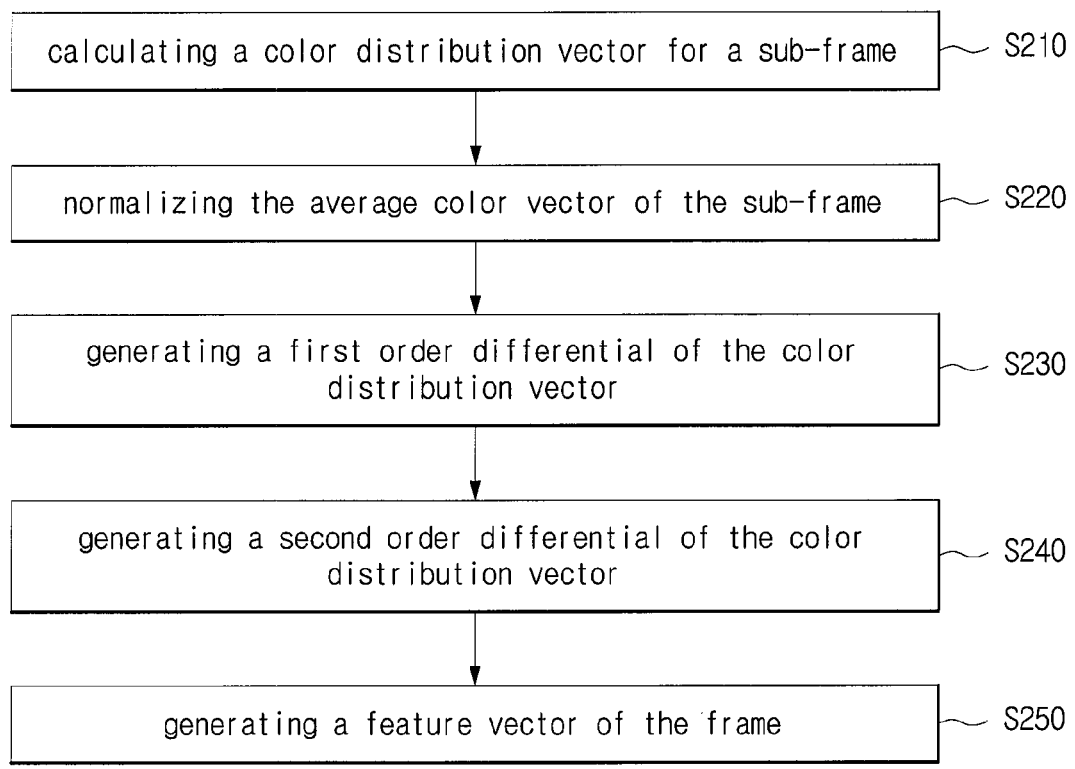
FIG. 2 is a flow chart of a frame feature vector generating method according to one embodiment of the present invention.

FIG. 2 is a flow chart of a frame feature vector generating method according to one embodiment of the present invention. In calculating a color distribution vector for a sub-frame (S210), a vector representing color distribution of a sub-frame which is defined by dividing a frame of a moving picture.

The color distribution vector is a vector which represents color distribution information in each sub-frame. Information in each sub-frame can be expressed by color vectors of pixels in the sub-frame. The Information of each sub-frame can be represented by a vector representing color distribution of the sub-frame.

In this embodiment, a moving picture frame divided in n×n form can have n2 sub-frames. However, a frame does not have to be divided in n×n form. A frame can be divided in m×n form (the n and m are two different arbitrary natural numbers).

A typical color distribution vector calculation method is to obtain an average vector of color vectors of pixels in a sub-frame. The color distribution vector for a sub-frame can be expressed by following equation.

$$D_i(t)=[R_i(t),G_i(t),B_i(t)] \quad \text{[Equation 1]}$$

The t is a time variable indicating location of the frame on a time axis which has an origin at the start point of the moving picture. The i is an index of each sub-frame of the frame (i=1, 2 . . . n2). Ri(t), Gi(t) and Bi(t) are averages of red, green, blue color component in sub-frame i, respectively.

The color distribution vector is expressed in a RGB color coordinate systems. However, another color coordinate system such as YUV and CYMK can be used to express a color vector of a pixel in the sub-frame. A color distribution vector of the sub-frame can be expressed in a same color coordinate system as the color vector of the pixel. It is obvious that a vector in a color coordinate system can be converted to a vector in another color coordinate system.

Normalization of the acquired color distribution vector Di(t) can be performed additionally (S220). For this, the Di(t) can be divided by average of color distribution vectors which belong to a certain time section including the t (for an example, from t−ϵ to t+ϵ). A minimum of color distribution vectors of the time section can be subtracted from the Di(t).

According to one embodiment of the present invention, normalizing of the color distribution vector using a minimum and/or an average of color distribution vectors of sub-frames corresponding to a same display area in the moving picture is described. However, normalizing method of a color distribution vector is not limited to the described.

In generating a first order differential of the color distribution vector (S230), the first order differential of the color distribution vector can be defined as a difference between a color distribution vector of a sub-frame and a color distribution vector of another sub-frame.

However, a first order differential may not be a vector of a same dimension with a color distribution vector. It can be a scalar value calculated as a difference between a component of a color distribution vector and a corresponding component of another color distribution vector. This discussion can be applied to a second order differential also.

The first order differential of the color distribution vector $E_{ij}(t)$ can be calculated by a following mathematical equation. In this case $E_{ij}(t)$ is a differential vector.

$$E_{ij}(t) = D_i(t) - D_j(t) \quad \text{[Equation 2]}$$

The t is a time variable indicating location of the frame on a time axis which starts from the start point of the moving picture. The i and the j are indices of the sub-frame (i, j=1, 2 ... n2 and n is an arbitrary natural number). In this embodiment, the $D_i(t)$ and the $D_j(t)$ are three dimensional vectors in RGB color coordinate system. The first order differential of the color distribution vector $E_{ij}(t)$ can be a three dimensional vector.

In generating a second order differential of the color distribution vector (S240), the second order differential of the color distribution vector can be defined as a difference between a first order differential and another first order differential.

As mentioned before about a first order differential, a second order differential may not be a vector. The second order differential can be calculated from a difference between a first order differential and another first order differential and the differential does not have to be a same dimension vector with the color distribution vector or the first order differential.

The second order differential of the color distribution vector $A_{ijkl}(t)$ can be calculated by a following mathematical equation.

$$A_{ijkl}(t) = E_{ij}(t) - E_{kl}(t) \quad \text{[Equation 3]}$$

Figure 3:
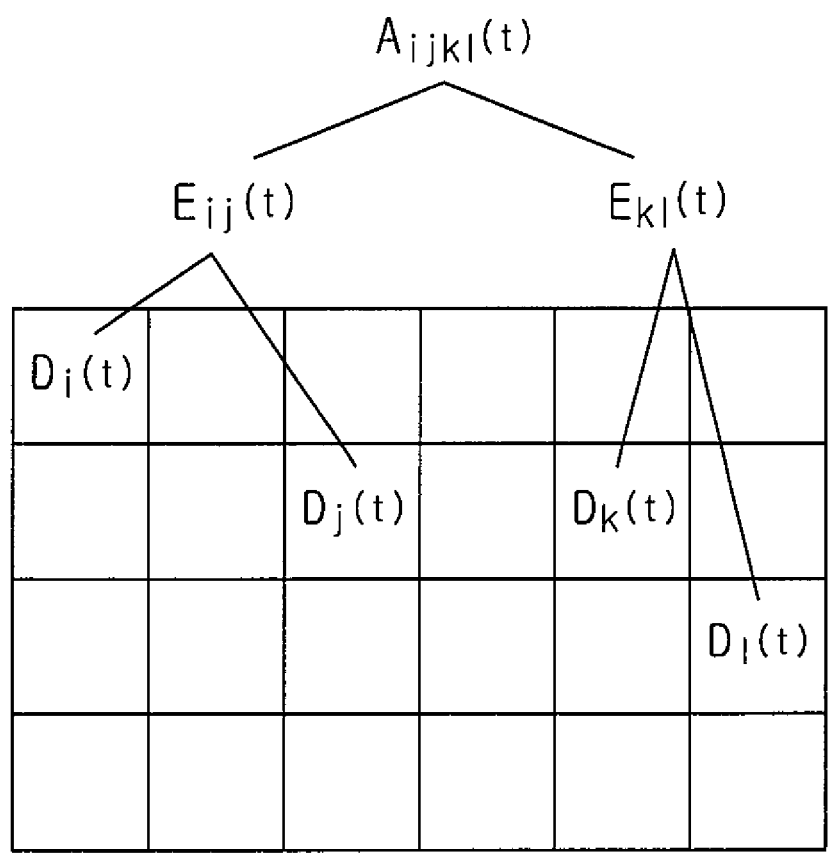
FIG. 3 illustrates a relation among a color distribution vector, a first order differential of the color distribution vector, and a second order differential of the color distribution vector according to one embodiment of the present invention.

The t is a time variable indicating location of the frame on a time axis which has an origin at the start point of the moving picture. The i, j, k and l (i, j, k, l=1, 2 ... $n^2$) are indices of the sub-frame. Relations among the color distribution vector, the first order differential of color distribution vector, the second order differential of color distribution vector can be understood referring to FIG. 3.

In generating a feature vector of the frame (S250), a feature vector of the frame is generated based on the result of prior calculations (S110, S120, S130, S140).

In this embodiment, characteristics of color distribution of the sub-frame color distribution is calculated based on color vectors of pixels in the sub-frame, in RGB color coordinate system (3 dimensional). The color distribution vector of the sub-frame, a first order differential of the color distribution vector and a second order differential of the color distribution vector are three dimensional vectors. The dimension of these vectors can be subordinate to the dimension of coordinate system in which the characteristics of color distribution of the sub-frame is expressed.

The calculated color distribution vector, the first order differential of the color distribution vector and the second order differential of the color distribution vector are representing information in a frame. Thus, a feature vector representing frame information can be generated by selecting a plurality of components from these vectors.

The feature vector can be composed by selecting more than one component from a set which consists of components of the color distribution vector, the first order differential of the color distribution vector and the second order differential of the color distribution vector. In case h (h is an arbitrary natural number) components are selected from these vectors the feature vector of the frame can be an h dimensional vector. The dimension of a feature vector can be modified for accuracy and rapidity of moving picture comparison.

Figure 4:
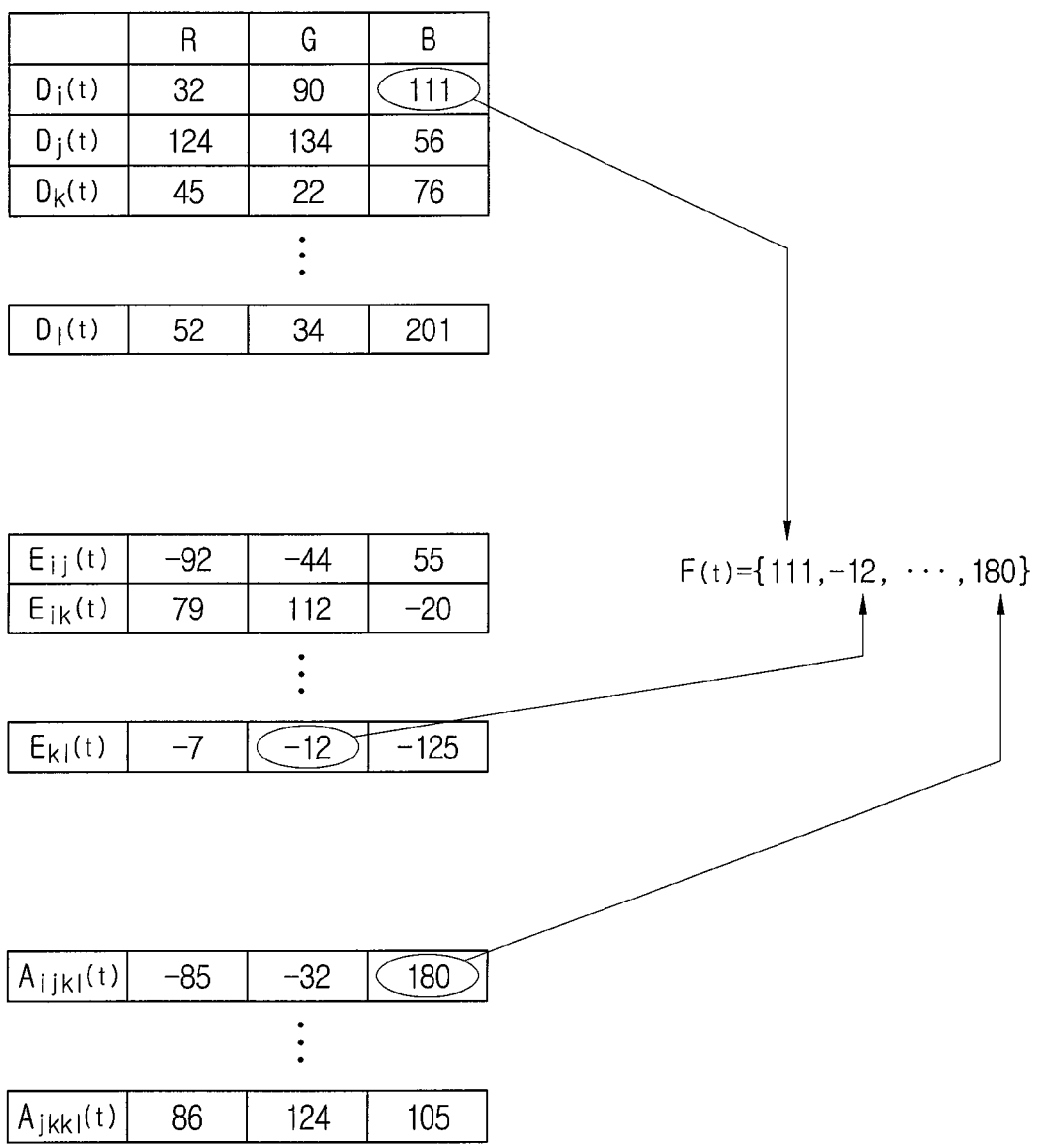
FIG. 4 illustrates composing of a feature vector from a color distribution vector, a first order differential of the color distribution vector, and a second order differential of the color distribution vector according to one embodiment of the present invention.

Composing a feature vector from the vectors can be understood referring to FIG. 4. In FIG. 4, more than one component of a color distribution vector of a sub-frame, a first order differential of the color distribution vector and a second order differential of the color distribution vector. It is not indispensable that at least one component is selected from each of the three vectors (a color distribution vector of a sub-frame, the first order differential of the color distribution vector and the second order differential of the color distribution vector). More than one type of the three can be excluded from composition of a feature vector.

The selection method described above is not the only solution for generating a feature vector and an additional calculation process can be utilized for generating a feature vector from the color distribution vector of the sub-frame, the first order differential of the color distribution vector and the second order differential of the color distribution vector.

The feature vector can be used as a finger print data of the frame. Problems of comparing entire information of a frame to determine commonality or similarity in moving pictures can be solved by utilizing a simplified feature vector described above.

A higher dimension of a feature vector may require a higher computing power and can provide a more accurate moving picture comparison. Thus, determining a proper dimension of the feature vector may be required.

Referring to FIG. 4, a first order differential and a second order differential are vectors of a same dimension as a color distribution vector. As mentioned above, the first and the second order differential may not be vectors. The first order differential and the second order differential can be calculated based on a just required component of a color distribution vector of a sub-frame to form a feature vectors. In this case, the first order differential and the second order differential can be a lower dimensional vector than a color distribution vector or be a scalar value.

A moving picture data can be separated into audio data and video data. A feature vector can be extracted for each of the data. The description for FIG. 1 to FIG. 4 is mainly about frame feature vector extraction based on the video data.

Figure 5:
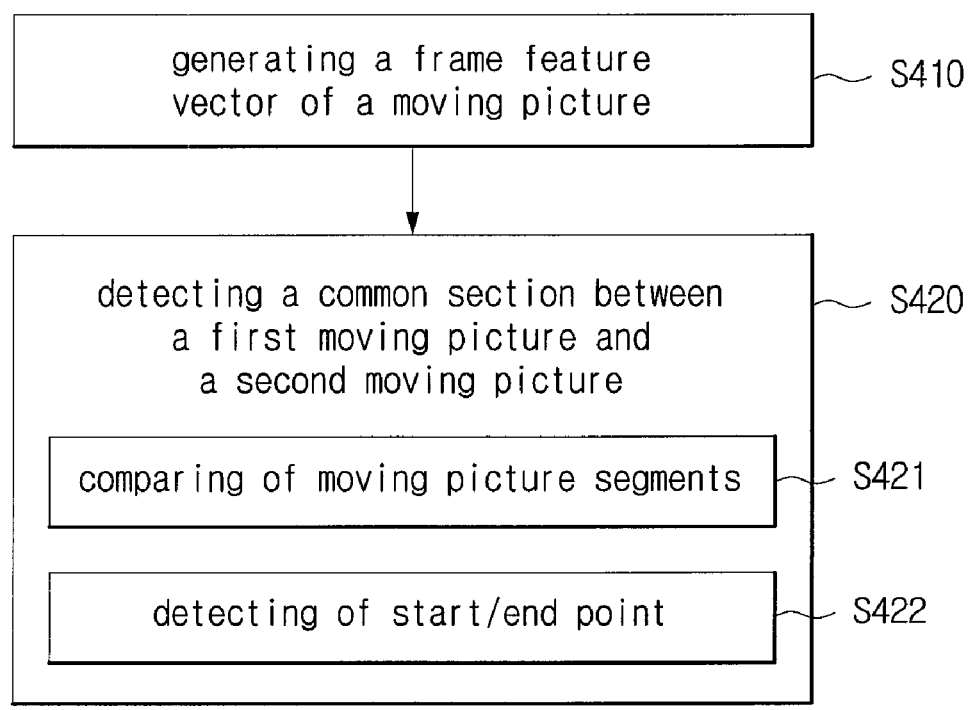
FIG. 5 is a flow chart of moving picture common section detecting method according to one embodiment of the present invention.

FIG. 5 is a flow chart of moving picture common section detecting method according to one embodiment of the present invention.

In generating a feature vector of a moving picture (S410), a feature vector of the frame can be extracted for each of comparison target moving pictures. The feature vector is an implication of information in the frame of the moving picture. A feature vector generating method according to one embodiment of the present invention is described above referring to FIG. 1 to FIG. 4.

A feature vector generating method for detecting a common section (S420) is not limited to the described feature vector generating (extracting) method above. The extracted information from a frame of a moving picture can be a basis of comparison of two moving pictures in detecting a common section (S420).

In detecting a common section of the first moving picture and the second moving picture (S420), a common section between two moving pictures can be examined by comparing feature vectors of the two moving pictures.

The Detecting of a common section (S420) can include comparing of moving picture segments (S421) to evaluate possibility of existence of a common section in the two moving pictures by comparing segments of the moving pictures, and detecting detail information of the common section (S422) to obtain detail information of the common section (information about a start point and an end point of the common section in each moving picture).

In comparing of moving picture segments (S421), by comparing a moving picture segment of the first moving picture and with a moving picture segment of the second moving picture, commonality in the two moving pictures can be measured.

According to one embodiment of the present invention, commonality between two moving picture segments can be evaluated based on comparison of corresponding feature vectors of moving picture segments.

The corresponding two feature vectors in the first and the second moving picture segment frame are feature vectors of the frames which have a same time interval from the start time of each moving picture segment.

Comparing of feature vectors can be fulfilled by calculating a distance of a feature vector of the first moving picture segment and a (corresponding) feature vector of the second moving picture segment.

According to one embodiment of the present invention, the feature vector, as mentioned above referring to FIG. 2 to FIG. 4, can be an h dimensional vector composed based on a color distribution vector of the frame, a first order differential of the color distribution vector and a second order differential of the color distribution vector. In case $F_b(t1)$ is a b-th component of a feature vector of $F(t1)$, a frame after t1 from the start point of the first moving picture segment, and $G_b(t2)$ is a b-th component of a feature vector of $G(t2)$, a frame after t2 from the start point of the second moving picture segment, a distance between the two corresponding feature vectors $D(t1, t2)$ can be defined by a L1 norm between them. The distance can be expressed as following equation.

$$D(t_1, t_2) = \sum_{b=1}^{h} |F_b(t_1) - G_b(t_2)|$$ [Equation 4]

The b is an index of a feature vector and the h is dimension of feature vector.

According to one embodiment of the present invention, the distance can be calculated for each feature vector pairs of the first and the second moving picture segment. In comparing of moving picture segments, commonality evaluation value between the two moving picture segments can be calculated based on the distance between the feature vectors. Sum or average of the distance of the feature vector pairs can be basis of the commonality evaluation value.

The distance between feature vectors do not have to be expressed by the L1 norm. A L2 norm and a L1 norm with a limited maximum value etc. can be utilized to express the distance between feature vectors. Also, in case the L1 norm value does not satisfy a certain threshold value the distance can be a set to 0 (for example, in case the L1 norm meets the threshold, the distance can be set to 1 and otherwise the, the distance can be set to 0).

A commonality evaluation value satisfying a pre-determined threshold value can indicate that there is commonality in the two target segments—the first and the second moving picture segment. The threshold can be determined based on preliminary test using a sample moving picture.

In case the commonality evaluation value calculated for the first moving picture segment and the second moving picture segment does not indicate commonality, moving picture segment comparison can be repeated for other start points of moving picture segments in the first moving picture and the second moving picture.

In case, commonality evaluation value indicates a severe difference between the two moving picture segments, commonality between adjacent segments may not be expected. Thus, it can be efficient to perform moving picture segment comparison for moving picture segments which have a relative greater time interval from the present comparison target segments.

Thus, for varying a time variable to point a next comparison target moving picture segment to repeat the comparison, a variation which is proportional to difference between the commonality evaluation value and the threshold required to indicate commonality, can be applied.

In case, commonality evaluation value indicates commonality in these two moving picture segments, detecting start-end point of a common section (S422) can be fulfilled.

Figure 6:
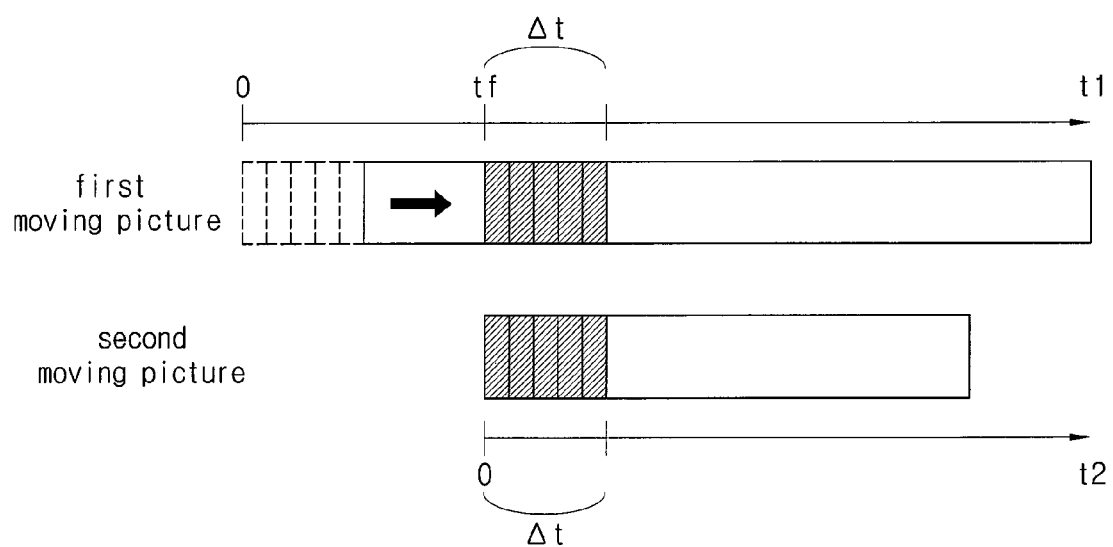
FIG. 6 illustrates a moving picture segment comparison process according to one embodiment of the present invention.

A moving picture segment comparison process according to one embodiment of the present invention can be understood referring to FIG. 6. Length of a moving picture segment for each of the first moving picture and the second moving picture is Δt. With the start point of the second moving picture segment set to the start of the second moving picture, the moving picture segment comparison can be repeated by varying the start point of the first moving picture segment from the start of the first moving picture.

Referring to FIG. 6, for a start point of the first moving picture segment tf, commonality evaluation value indicates commonality between the two comparison target segments. Because the commonality evaluation value is based on comparison for relatively small number of frame, detecting of start-end point of a common section (S422) can be fulfilled to detect accurate start-end point of the common section.

By performing the comparison of moving picture segments using a smaller fps prior to the detection of common section start-end point, computing powers required to compare many moving pictures can be saved.

In detecting of a start point and an end point of a common section (S422), in case commonality evaluation value calculated in moving picture segment comparison (S421) indicates commonality in the two moving picture segments, the start point and the end point of the common section can be detected for each of the first moving picture and the second moving picture.

As mentioned above, for the common section start-end point detection, a greater fps (frames per second) than the fps of frames used in moving picture segment comparison can be applied. This can enhance accuracy of the common section start-end point detection and save computing power required for comparing of moving picture segments.

Referring to FIG. 6, because the commonality is identified when the start time of moving picture segment in the first moving picture reaches tf, the common section detection can be limited to after tf. Namely, frames which locate only after the tf in the first moving picture can be compared with the frames of the second moving picture in the common section start-end point detection.

The initial part of the second moving picture can correspond to the middle part of the first moving picture as in FIG. 6 and vice versa. The description above referring to FIG. 6 can be understood even if the first moving picture and the second moving picture are interchanged.

Figure 7:
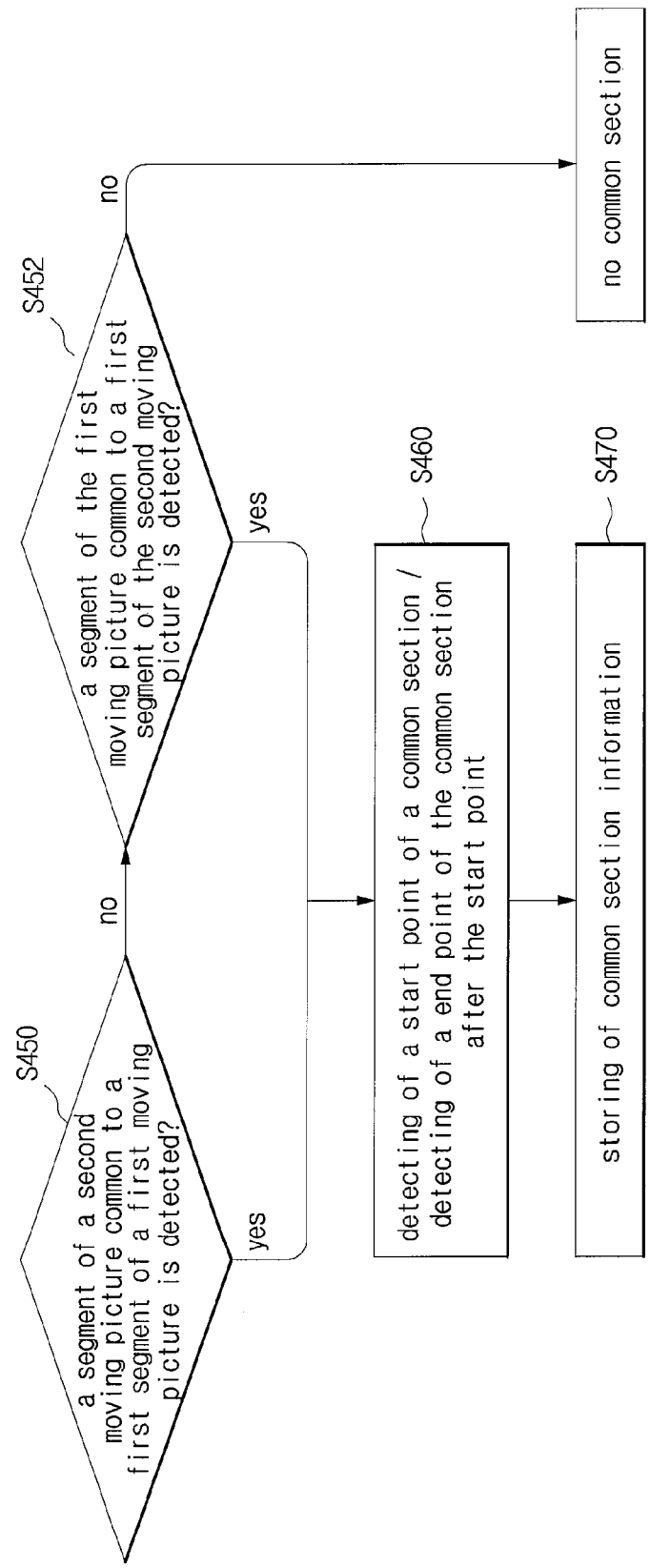
FIG. 7 is a flow chart of common section detecting method between two moving pictures according to one embodiment of the present invention.

FIG. 7 is a flow chart of common section detecting method between two moving pictures according to one embodiment of the present invention and FIG. 8 illustrates commonality relations between two moving pictures according to one embodiment of the present invention.

A segment in the second moving picture same as ((identical/similar to) the initial segment of the first moving picture (a segment including the start point of the first moving picture) can be detected, by repeating the comparison from the start point of the second moving picture (S450). 4 detectable types of a common section are illustrated in FIG. 8.

In FIG. 8, the two moving pictures can be entirely overlapped in (a). In (b), the upper moving picture (the first moving picture) can be included in the lower one (the second moving picture). In (c) and (d), the two moving pictures show a partially overlapped common section. These 4 type common sections cab be detected by comparing the initial part of the upper moving picture (the first moving picture) with the lower (second) moving picture.

In case a common section is detected, start-end point of the common section can be detected (S460). For an example, the start point of the common section for each of the first moving picture and the second moving picture, can be the start point of a moving picture segment which shows commonality in each moving picture. In FIG. 8, the common section start point of the first moving picture can be the start point of the first moving picture, and the common section start point of the second moving picture can be the start point of a first segment which shows commonality with the moving picture segment of the first moving picture because the moving picture segment comparison is repeated from the start to the end of the second moving picture. When, the common section start point is determined, by comparing frame feature vectors of frames of each moving picture only after the start point, the common section end point can be determined.

This detected information about the common section can be stored in a database (S470). The common section start-end point information can be include time information and/or frame information. Also, in case no segment in the second moving picture corresponding to the initial (first) segment of the first moving picture is found, comparison of the two moving pictures can be fulfilled about a first (initial) segment of the second moving picture (S452). The comparison process may be similar to the description given above referring to FIG. 6. In case no commonality is indicated in the moving picture segment comparison (S450, S452), it is considered that there is no common section between the two moving pictures. The common section detection of moving picture segment related FIG. 7 and FIG. 8 can be performed by using a commonality evaluation value described above referring to FIG. 5.

For the detection of common section between moving pictures, a feature vector generated from audio data can be considered additionally. To enhance accuracy of the moving picture comparison using a frame feature vector from video data and to verify the comparison, the audio feature vector can be used. For an example, in case there is a blank section (for an example, all black/blue frames in a while or missing/damaged video data) in a moving picture, the audio feature vector (audio finger print) extracted from the audio data can be utilized.

Various methods can be used to extract the audio feature vector from the audio data. For an example, the audio feature vector can be extracted based on at least one of MFCC (Mel Frequency Cepstral Coefficient), PLPC (Perceptual Linear Prediction Coefficient) and LPC (Linear Prediction Coefficient) of a frame of the moving picture. It is obvious that the audio feature vector generating method does not have to be limited to the described above. A method known to a person having ordinary skill in the art can be applied also.

Figure 9:
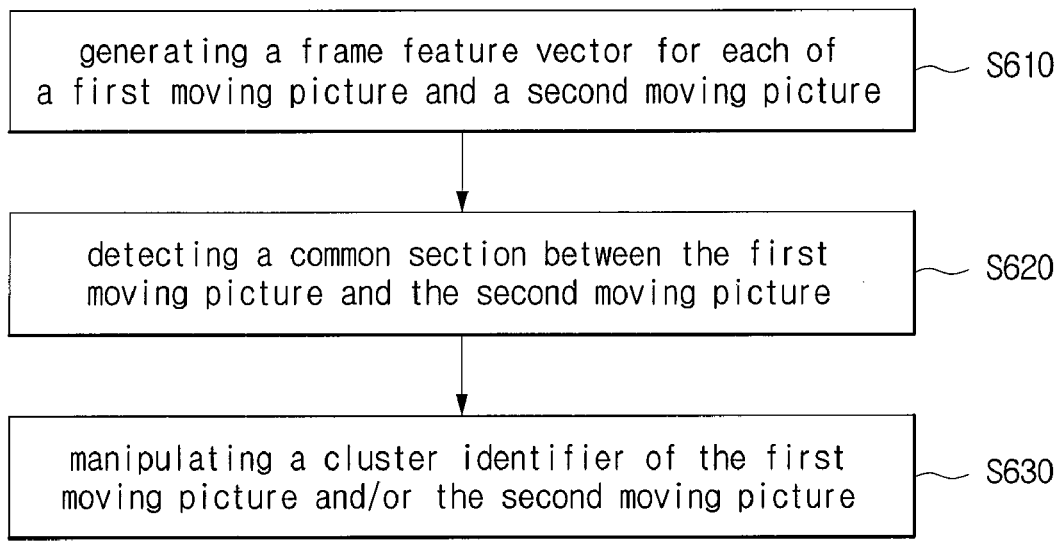
FIG. 9 is a flow chart of moving picture clustering method according to one embodiment of the present invention.

FIG. 9 is a flow chart of moving picture clustering method according to one embodiment of the present invention. Referring FIG. 9, generating a feature vector of a first moving picture and a second moving picture (S610) and detecting a common section of the two moving pictures (S620) is performed prior to cluster identifier manipulating of the moving picture. The two processes are described above referring to FIG. 1 to FIG. 8.

However, a feature vector generating method and a common section detecting method for a moving picture clustering are not limited to the described above. The clustering can be accomplished based on an information, reasoned on another criterion, that the two moving pictures share a common section.

In manipulating a cluster identifier of the first moving picture and/or the second moving picture (S630), a same cluster identifier can be granted to two moving pictures which share a common section. A cluster identifier of another moving picture (neither of the first and the second moving picture) can be manipulated to the same cluster identifier.

For an example, in case the two cluster identifiers of the two moving pictures sharing a common section are different, at least one cluster identifier of them must be modified. An old cluster identifier of a moving picture can be modified to the new cluster identifier (a same cluster identifier as the other moving picture.

In case the two comparison target moving pictures do not share a common section, a new cluster identifier of a new cluster can be given to a moving picture of the two moving pictures.

It may be an exhausting work to manipulating cluster identifiers of moving pictures by examining all possible pairs of a plurality of moving pictures. Various methods to save computing power can be utilized.

For an example, for duplicate (identical) moving pictures a same cluster identifier can be grated. Comparison result for one of the duplicate moving pictures can be applied to another duplicate moving picture.

Also, efficiency of moving picture comparison can be enhanced by comparing moving pictures which have a greater possibility to be grouped into a single cluster prior to other moving pictures. For an example, for selecting moving pictures to be compared, it can be efficient to put a higher priority to a moving picture pair which shares a common section.

According to one embodiment of the present invention, the moving picture for clustering can be collected from the web. The text token of the collected moving picture can include a title of the moving picture, a text in description for a context and a theme of the moving picture, a keyword inputted by a user to search the moving picture and a tag of a blog post including the moving picture.

Figure 10:
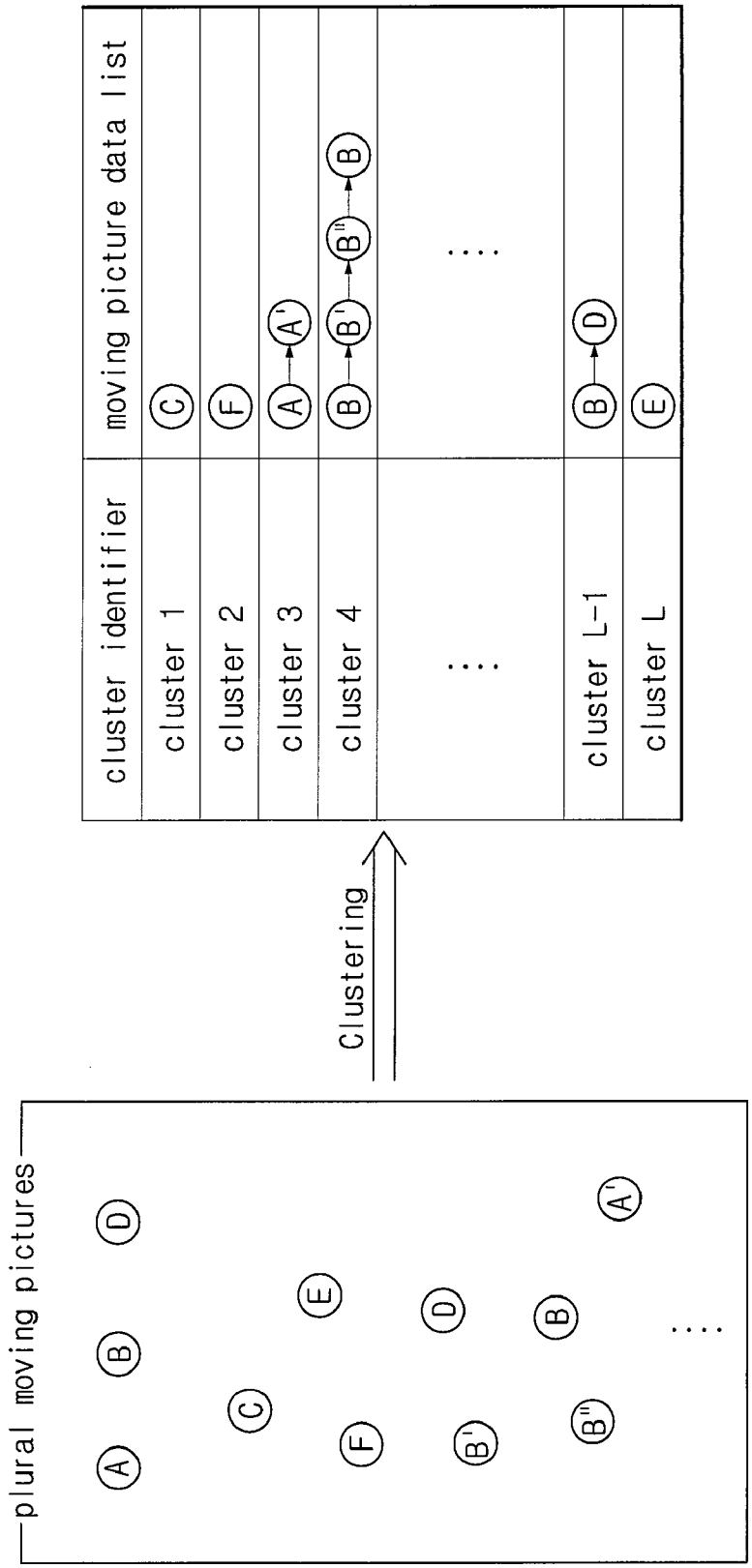
FIG. 10 illustrates a circumstance and a result of moving picture clustering according to one embodiment of the present invention.

FIG. 10 illustrates a circumstance and a result of moving picture clustering according to one embodiment of the present invention. Moving picture clustering, for a plurality of moving picture data, can include detecting of data which have commonality by comparing the moving picture data and grouping of them.

Referring to FIG. 10, the cluster 1 includes the moving picture C only. It may mean there is no other moving picture which has commonality with the moving picture C. The cluster 4 includes moving picture data B-B'-B"-B. It means that there are 4 different moving picture data which have commonality in the cluster 4. The moving picture B includes 2 identical (duplicate) moving pictures.

The cluster L-1 includes the moving picture B and the moving picture D. This cluster can be merged with the cluster 4. In case commonality in the moving picture B' of the cluster 4 and the moving picture B of the cluster L-1 is detected, the two clusters can be merged. However, in case there is commonality between the picture D and the moving picture B, and there is no commonality in the picture D compared with the moving picture B' and B", mergence of the two cluster can be optional.

Figure 11:
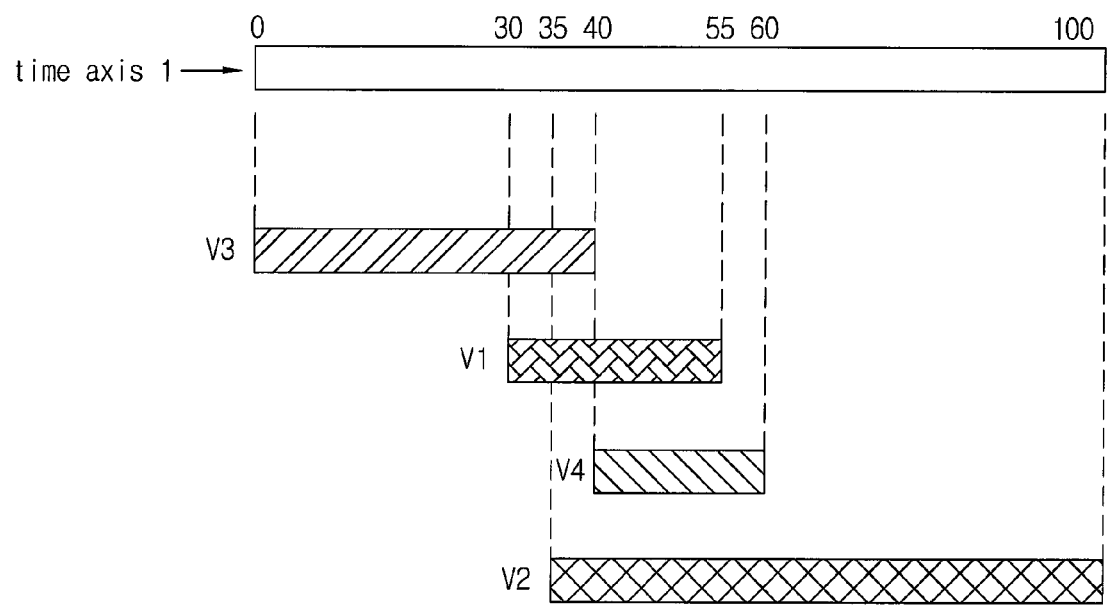
FIG. 11 illustrates an arrangement result on a common time axis for moving picture of a moving picture cluster according to one embodiment of the present invention.

FIG. 11 illustrates an arrangement result on a common time axis for moving picture of a moving picture cluster according to one embodiment of the present invention. There are shown 4 moving pictures of V1, V2, V3 and V4. These 4 moving pictures are arranged considering common sections.

Each moving picture in a cluster can have time information about a start point and an end point of common section (overlapped section). The moving picture V3 has a length of 40 seconds. The moving picture V1 has a length of 30 seconds.

Start point:end point information of a common section in the V3 can be expressed as 30:40 on a relative time axis which starts from the start point of the V3. For V1 the information of the common section can be expressed as 0:10. It is known, from the start point time information of the common section, that the V1 starts 30 second later than the V3. (The common section of the two moving pictures starts at O second point of the V1 and 30 second point of the V3.) Thus, a relative arrangement of two moving pictures can be determined by comparing start point information of a common section expressed considering each start point of the two moving pictures.

In this case, the start point:end point information of V1 can be expressed in a common time axis of the two moving pictures, by adding the time difference of start point time (30 second) to the start point:end point information expressed in the relative time axis described above (The common time axis can be a time axis having an origin at the start point of the most precedent moving picture). Thus, the start point:end point time information of the V1 can be converted to 30:60 second (in a time axis 1). Also, start point:end point information of the common section in the V1 can be converted to 30:40 on a time axis 1 in FIG. 11.

By repeating this process for moving pictures in a cluster, relative arrangement of moving pictures sharing a common section can be determined and time information of the moving picture data of the cluster can be expressed on a common time axis.

FIG. 12 illustrates a data structure storing information of a moving picture cluster according to one embodiment of the present invention. Referring to FIG. 12, a moving picture list can be generated for each cluster described by an identifier and start point/end point time information of a moving picture.

For a cluster which has a cluster identifier of 1, the moving picture list consists of 3:0/1202, 5:220/600, 7:500/700, 9:600:800 and 11:700/900. The 3, 5, 7, 9 and 11 in the list are identifiers of moving picture (moving picture data). The 0/1202, 220/600, 500/700, 600/800 and 700/900 are start point/end point of each moving picture data in a cluster.

Referring to FIG. 12, the cluster information can include rank information and cluster date information. The rank information can be a total numbers of moving picture data in a moving picture list. The cluster date information can be the most early time information among the file generation (modification) time information of moving pictures in a moving picture list. The rank information and the cluster date information can be considered for determining orders of moving pictures in a cluster.

A representative moving picture can be selected for a moving picture cluster. For an example, the representative moving picture can be a moving picture which shows general contents of the moving picture cluster. Thus, if there is a long moving picture covering the entire contents of all moving pictures of the cluster, the moving picture can be selected as a representative moving picture of the cluster.

In case, there is not a single moving picture covering entire moving pictures, moving pictures of a moving picture set which cover contents of the cluster with a minimum number of element moving picture can be representative moving pictures of the cluster.

Figure 13:
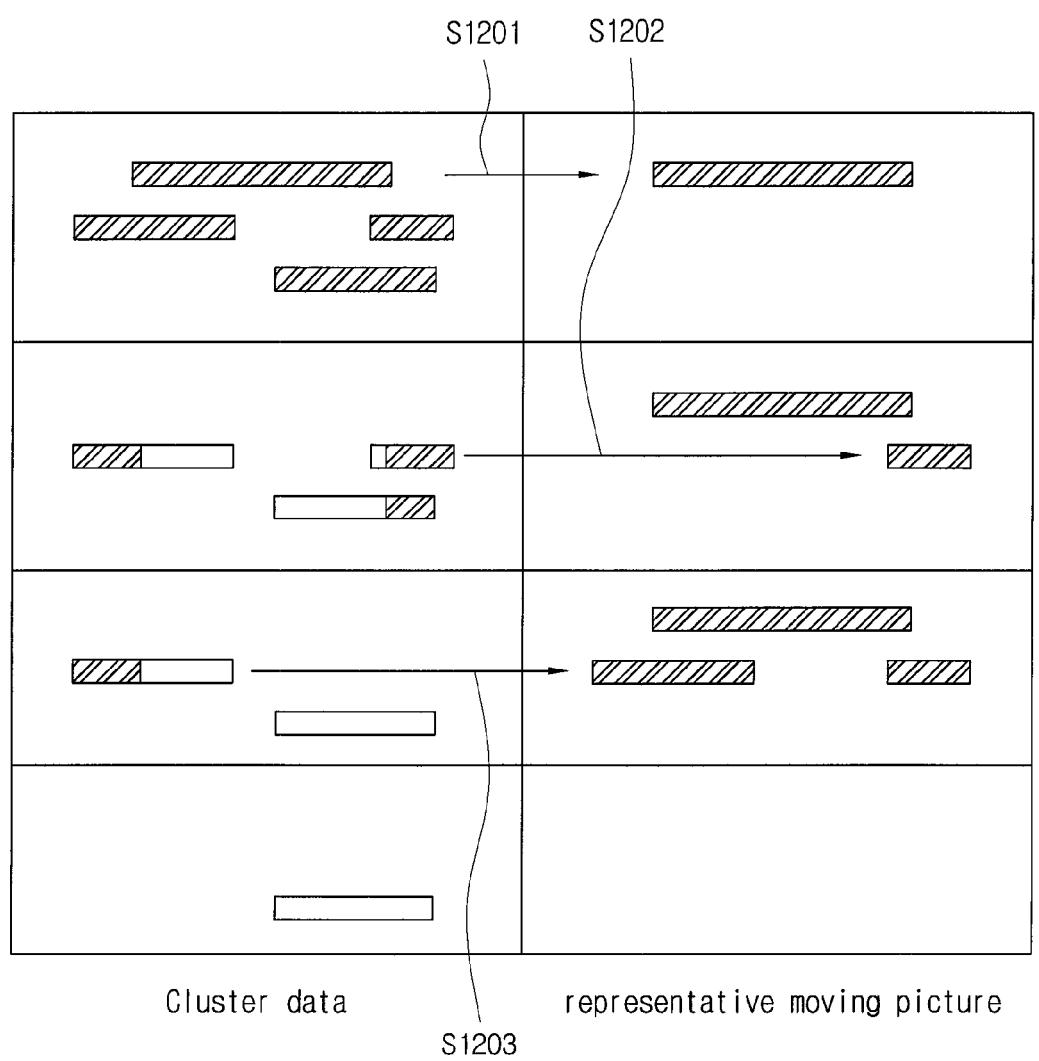
FIG. 13 illustrates process of determining a representative moving picture in a moving picture cluster according to one embodiment of the present invention.

FIG. 13 illustrates process of determining a representative moving picture in a moving picture cluster according to one embodiment of the present invention. Referring to FIG. 13, a longest moving picture is moved to the representative moving picture list (S1201). In case there are several longest moving pictures, a moving picture which has the best quality can be selected by considering display quality information (or be selected arbitrarily).

Then, among the rest moving pictures, a moving picture which has a longest play-time of un-overlapped sections with the selected moving picture data can be selected next and moved (marked) to the representative moving picture list. These processes can be preformed repetitively (S1202, S1203).

By repeating these processes, a representative moving picture list can be obtained. The entire moving picture data can be composed by using the moving picture data in the representative moving picture list.

Figure 14:
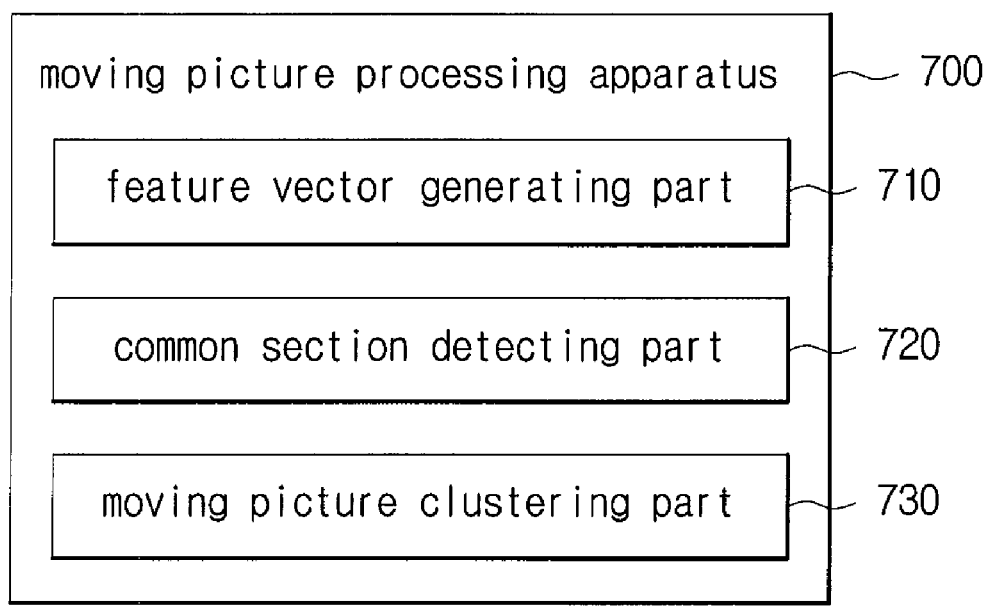
FIG. 14 illustrates a configuration of a moving picture processing apparatus according to one embodiment of the present invention.

FIG. 14 illustrates a configuration of a moving picture processing apparatus according to one embodiment of the present invention. Referring to FIG. 14, a moving picture processing apparatus (700) can include a feature vector generating part (710), a common section detecting part (720) and moving picture clustering part (730).

The feature vector generating part (710) can load a target moving picture, observe a divided frame of the moving picture and produce a feature vector of the frame. The moving picture processing apparatus (700) extract a feature vector representing a frame from color distribution information of a still image which can be displayed as a frame of the moving picture. In this process, the frame can be divided into several sub-frames.

A color distribution vector can be obtained from color vectors of pixels of a sub-frame. By using a first order differential and a second order differential of the color distribution vector, a component of the feature vector can be calculated. Detail description about feature vector generation was given referring to FIG. 2 to FIG. 4 above.

The common section detecting part (720) identifies a common section shared by the target moving pictures by comparing the moving pictures.

Detecting of a common section between the moving pictures can be fulfilled by comparing moving picture feature vectors. In this process, possibility of common section existence can be detected by moving picture segment comparison. The possibility can be expressed in a commonality evaluation value by the segment comparison. Detail description of calculating the commonality evaluation value was given referring to FIG. 5 to FIG. 8 above.

Also, in case the commonality evaluation value indicates commonality between two moving pictures, the common section detecting part (720) can detect a common section occupied part from each of the two moving pictures. For this, a greater fps (frames per second) can be applied than the moving picture segment comparison. A start point and an end point of a common section can be defined as a starting/ending time (or frame) of the common section in a moving picture. Detail description of detecting start-end point of a common section is given above referring to FIG. 5 and redundant description will be omitted.

The moving picture clustering part (730) can group moving pictures which share a common section, into a cluster. Clustering of moving pictures can be fulfilled by granting a same cluster identifier to moving pictures which share a common section. In this process, a new cluster identifier, substituting an old cluster identifier of a moving picture, can be granted to another moving picture which had the old cluster identifier.

Detail description of manipulating a cluster identifier in the moving picture clustering was given above referring to FIG. 9. Also, it is noted that common section detection and clustering for moving pictures which share a text token can be fulfilled preliminarily.

The moving picture clustering part (730) can select a representative moving picture for a created cluster. As described above referring to FIG. 13, a typical method of choosing the representative moving picture is choose the longest moving picture in the cluster. Also, it was noted above that several moving pictures, covering entire video information of moving pictures of the moving picture cluster, can be selected as representative moving pictures.

The moving picture clustering part (730) can arrange (convert) time information of plural moving pictures of the created cluster. According to one embodiment of the present invention, the common section detecting part (720) can detect start-end point of the common section of the moving picture in a relative time axis which starts at the start point of the moving picture. As mentioned above referring to FIG. 11 and FIG. 12, by the moving picture clustering part (730), time information of each moving picture in the cluster (start-end point and overlapping time information of all moving pictures) can be expressed in a common time axis. The origin of the common time axis can be set to a start point of the most precedent (most front/initial) moving picture in the cluster.

A moving picture processing method according to one embodiment of the present invention can be recorded on a computer readable medium as a digital code. The computer readable medium can include all types of media which can be read by a computer system. For example, a ROM, a RAM, a CD-ROM, a magnetic tape, a floppy disk, optical data storage medium can be used.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

INDUSTRIAL APPLICABILITY

According to one embodiment of the present invention, a moving picture processing method and an apparatus thereof to enhance efficiency of moving picture comparison process and providing the comparison result are provided.

According to one embodiment of the present invention, a method and an apparatus to generate a feature vector which can be used as a comparison criterion for determining commonality and similarity between moving pictures are provided.

According to one embodiment of the present invention, a method and an apparatus to detect a common section between two moving pictures using feature vectors of the moving pictures and to obtain time information of the common section are provided.

According to one embodiment of the present invention, a method and an apparatus to gather moving pictures which have commonality (namely, share a common section) into a group are provided.

The invention claimed is:

1. A method of processing a moving picture on an apparatus including at least one computer processor for executing commands that direct operations of the apparatus and a memory operatively coupled to the at least one processor, the memory storing code operable when executed with the at least one processor, the method comprising:

generating a frame feature vector for each of a first moving picture and a second moving picture; and detecting a common section of the first moving picture and the second moving picture by comparing the frame feature vector of the first moving picture with the frame feature vector of the second moving picture, wherein the detecting of the common section comprises comparing moving picture segments by generating commonality evaluation value of a first moving picture segment and a second moving picture segment by comparing feature vectors of p frames of the first moving picture segment of the first moving picture with feature vectors, corresponding arrangement to an arrangement of the p frames of the first moving picture segment, of p frames of the second moving picture segment of the second moving picture, p being a natural number of greater than or equal to 1, wherein the first moving picture segment has a start time of t1 after the first moving picture starts and the second moving picture segment has a start time of t2 after the second moving picture starts, and the comparing of moving picture segments is repeated for t1 and t2, t1 being a start time of the first moving picture segment that is equal to or greater than 0 and is smaller than a length of the first moving picture, t2 being a start time of the second moving picture segment that is equal to or greater than 0 and is smaller than a length of the second moving picture, and the detecting of common section further comprises detecting a common section start-end point by detecting a start time and an end time of a common section in the first moving picture and the second moving picture, respectively, by comparing the feature vector of the first moving picture with the feature vector of the second moving picture by applying a greater number of frames per second than the number of frames per second of the p frames in the first moving picture segment and the second moving picture segment, in case the commonality evaluation value indicates that there is commonality in the first moving picture segment and the second moving picture segment.

2. The method of claim 1, wherein the comparing of moving picture segments is performed by setting t1 as a start point (t1=0) of the first moving picture and incrementing t2 from a start point (t2=0) of the second moving picture, and the detecting of a common section start-end point compares the feature vector of the first moving picture only with the feature vector of a frame located after tg, the tg being a point after the second moving picture starts and being a start time of the second moving picture segment and indicating that the commonality evaluation value indicates that there is commonality in the first moving picture segment and the second moving picture segment.

3. The method of claim 1, wherein while repeating the comparing of moving picture segments, a change in t1 and/or t2 is proportional to a difference between a reference value and the commonality evaluation value if the commonality evaluation value does not satisfy the reference value, the reference value indicating that there is commonality in the first moving picture segment and the second moving picture segment.

4. The method of claim 1, wherein the detecting of the moving picture common section is performed by further considering an audio feature vector generated based on audio data extracted the first moving picture and the second moving picture.

5. An apparatus of processing a moving picture, comprising:

a feature vector generating part generating a feature vector for the first moving picture and the second moving picture respectively; and a common section detecting part detecting a common section between the first moving picture and the second moving picture by comparing a feature vector of the first moving picture with a feature vector of the second moving picture, wherein the common section detecting part comprises a moving picture segment comparing part generating commonality evaluation value of a first moving picture segment having a start time of t1 after the first moving picture starts and a length of .DELTA.t and a second moving picture segment having a start time of t2 after the second moving picture starts and a length of .DELTA.t, by comparing feature vectors of p frames of the first moving picture segment of the first moving picture with feature vectors, corresponding arrangement to an arrangement of the p frames of the first moving picture segment, of p frames of the second moving picture segment of the second moving picture, p being a natural number of greater than or equal to 1, and a common section start-end point detecting part detecting a start time and an end time of a common section in the first moving picture and the second moving picture respectively, by comparing the feature vector of the first moving picture with the feature vector of the second moving picture by applying a greater number of frames per second than the number of frames per second of the p frames in the first moving picture segment and the second moving picture segment, in case the commonality evaluation value indicates that there is commonality in the first moving picture segment and the second moving picture segment.

\* \* \* \* \*